United States Patent
Lee et al.

(10) Patent No.: US 12,442,022 B2
(45) Date of Patent: Oct. 14, 2025

(54) ENZYME NANOPARTICLES WITH METHANE OXIDATION ACTIVITY

(71) Applicant: Korea University Research and Business Foundation, Seoul (KR)

(72) Inventors: Jeewon Lee, Seoul (KR); Hyun Jin Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 335 days.

(21) Appl. No.: 17/599,153

(22) PCT Filed: Mar. 20, 2020

(86) PCT No.: PCT/KR2020/003841
§ 371 (c)(1),
(2) Date: Sep. 28, 2021

(87) PCT Pub. No.: WO2020/204425
PCT Pub. Date: Oct. 8, 2020

(65) Prior Publication Data
US 2022/0170051 A1 Jun. 2, 2022

(30) Foreign Application Priority Data
Mar. 29, 2019 (KR) .......................... 10-2019-0036923

(51) Int. Cl.
*C12P 7/04* (2006.01)
*C12N 9/02* (2006.01)
*C12N 9/96* (2006.01)
*C12N 11/04* (2006.01)

(52) U.S. Cl.
CPC .............. *C12P 7/04* (2013.01); *C12N 9/0071* (2013.01); *C12N 9/96* (2013.01); *C12N 11/04* (2013.01); *C12Y 114/13025* (2013.01); *C12Y 114/18003* (2013.01)

(58) Field of Classification Search
None
See application file for complete search history.

(56) References Cited

U.S. PATENT DOCUMENTS

| | | | | |
|---|---|---|---|---|
| 7,226,768 | B2 * | 6/2007 | Farinas ..................... | C12P 7/04 435/71.1 |
| 10,648,006 | B2 * | 5/2020 | Arnold ...................... | C12P 7/06 |
| 2012/0020879 | A1 | 1/2012 | Watt | |

FOREIGN PATENT DOCUMENTS

| | | | |
|---|---|---|---|
| JP | 2001-275653 A | | 10/2001 |
| JP | 2005-95002 A | | 4/2005 |
| JP | 2020137469 A | * | 9/2020 |
| KR | 10-2016-0061304 A | | 5/2016 |
| KR | 10-2016-0094550 A | | 8/2016 |
| KR | 10-2017-0025215 A | | 3/2017 |
| KR | 10-2017-0027683 A | | 3/2017 |
| WO | WO 2004/108890 A2 | | 12/2004 |
| WO | WO 2014/062703 A1 | | 4/2014 |

OTHER PUBLICATIONS

Merkx (2001, https:doi.org).*
Culpepper, Megen A. et al., "Structure and Protein-Protein Interactions of Methanol Dehydrogenase from *Methylococcus capsulatus* (Bath)," Biochemistry, 53,39, 2014 (pp. 6211-6219).
Men, Dong, et al., "Self-Assembly of Ferritin Nanoparticles into an Enzyme Nanocomposite with Tunable Size for Ultrasensitive Immunoassay," Acs Nano, 9, 11, 2015 (pp. 10852-10860).
Blanchette, Craig D., et al., "Printable Enzyme-Embedded Materials for Methane to Methanol Conversion," Nature communications, 7, 1, 2016 (pp. 1-9).
International Search Report issued on Jun. 30, 2020 in counterpart International Patent Application No. PCT/KR2020/003841 (3 pages in English and 3 pages in Korean).
Park, Jin-Seung, et al. "Enhanced stability of heterologous proteins by supramolecular self-assembly." Applied microbiology and biotechnology 75.2 (2007): 347-355.
Zhang, Youyu, et al. "Apoferritin nanoparticle: a novel and biocompatible carrier for enzyme immobilization with enhanced activity and stability." Journal of Materials Chemistry 21.43 (2011): 17468-17475.
Park, Donghyun, et al. "Biological conversion of methane to methanol." Korean Journal of Chemical Engineering 30.5 (2013): 977-987.
Tetter, Stephan, et al. "Enzyme encapsulation by a ferritin cage." Angewandte Chemie International Edition 56.47 (2017): 14933-14936.
Japanese Office Action issued on Sep. 20, 2022, in counterpart Japanese Patent Application No. 2021-558597, (3 pages in Japanese).
Li, Ai-Peng, et al. "Ferritin: A Powerful Platform for Nanozymes." Prog. Biochem. Biophys 45 (2018): (11 pages in English, 1 page in Japanese).
Kim, Hyun Jin, et al. "Biological conversion of methane to methanol through genetic reassembly of native catalytic domains." Nature Catalysis 2.4 (2019): 342-353.
Chan, Sunney I., et al. "Copper protein constructs for methane oxidation." Nature Catalysis 2.4 (2019): 286-287.

(Continued)

Primary Examiner — Hope A Robinson
(74) Attorney, Agent, or Firm — NSIP Law

(57) ABSTRACT

The present invention relates to novel enzyme nanoparticles capable of converting methane into methanol, in which key active sites of methane-oxidizing bacteria are fused with each other and expressed on a protein that can be self-assembled in cells to form nanoparticles, and specifically to enzyme nanoparticles including a protein having methane monooxygenase (MMO) activity and active sites of the methane oxidase, a method for production thereof, a recombinant microorganism into which a nucleic acid encoding the protein and the active site of the methane oxidase is introduced, and immobilized enzyme nanoparticles including the enzyme nanoparticles loaded on a carrier.

3 Claims, 7 Drawing Sheets
Specification includes a Sequence Listing.

(56) References Cited

OTHER PUBLICATIONS

Extended European search report issued on Nov. 28, 2022, in counterpart European Patent Application No. 20783549.7 (10 pages in English).
Korean Office Action Issued on Apr. 8, 2025, in Counterpart Korean Patent Application No. 10-2019-0036923 (2 Pages in English, 2 Pages in Korean).

* cited by examiner

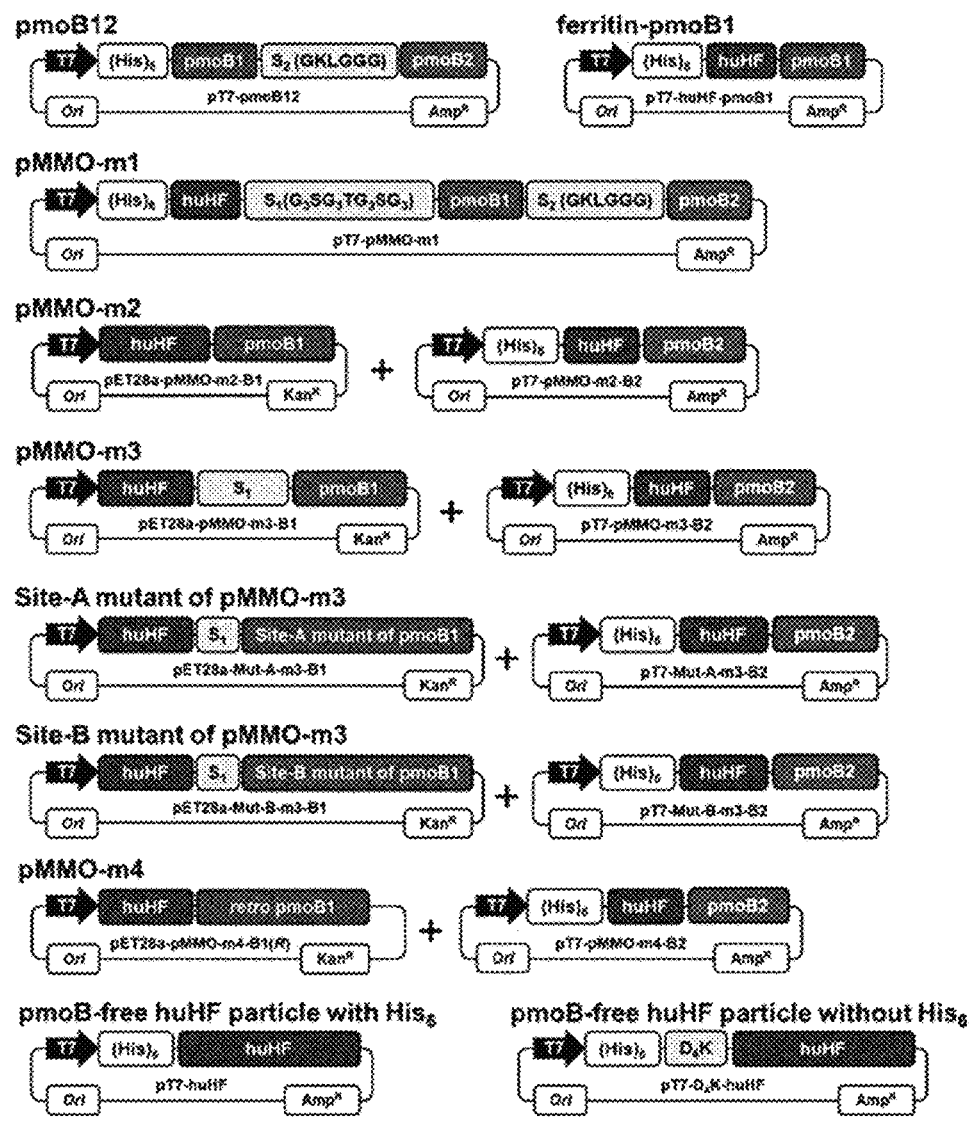
[FIG. 1]

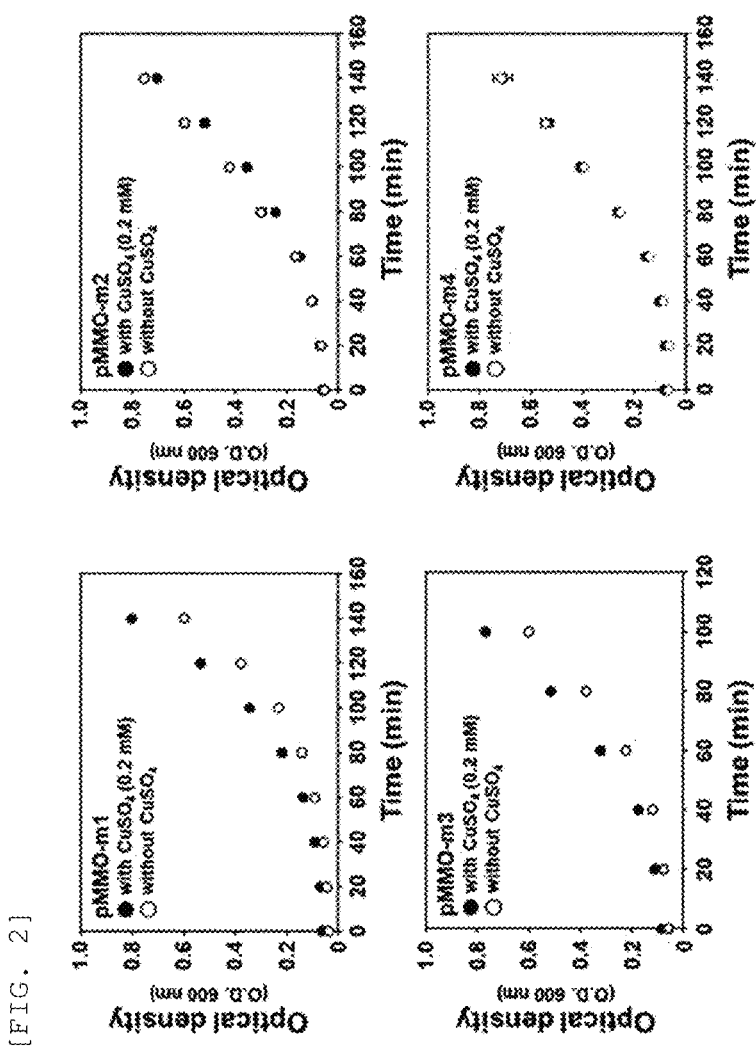
[FIG. 2]

[FIG. 3]
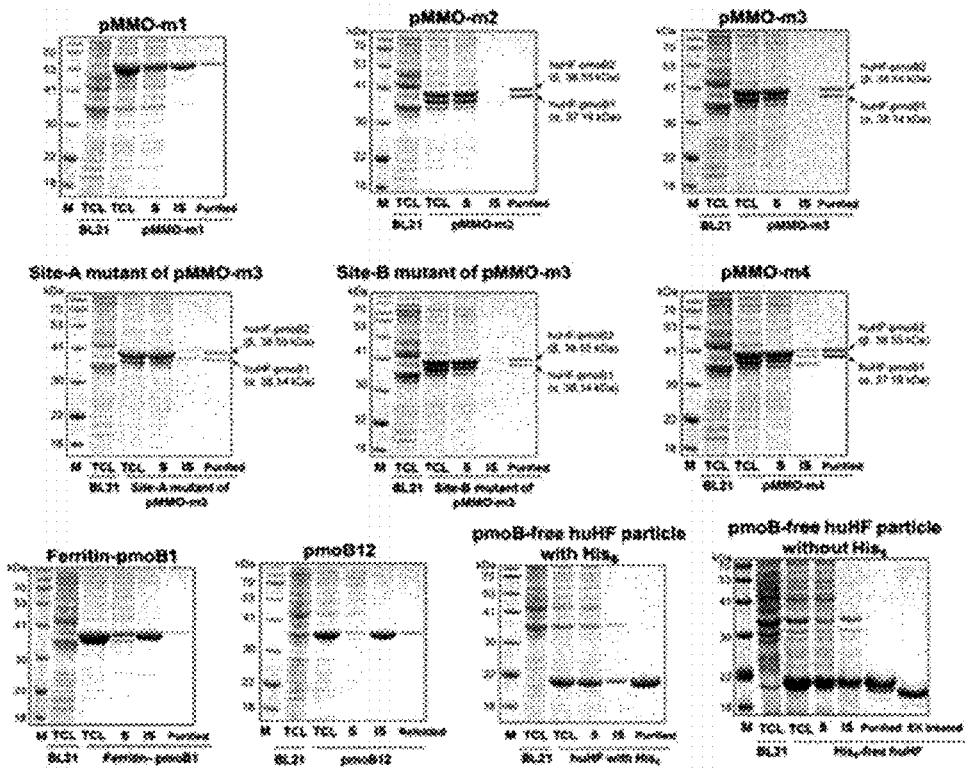
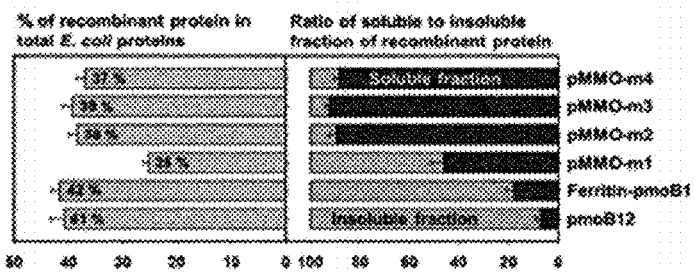
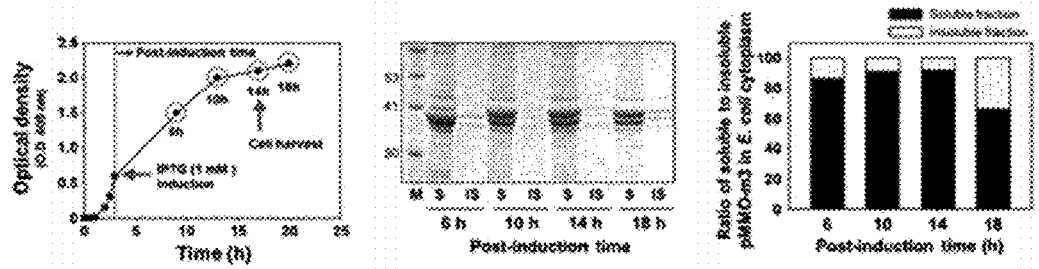

[FIG. 4]
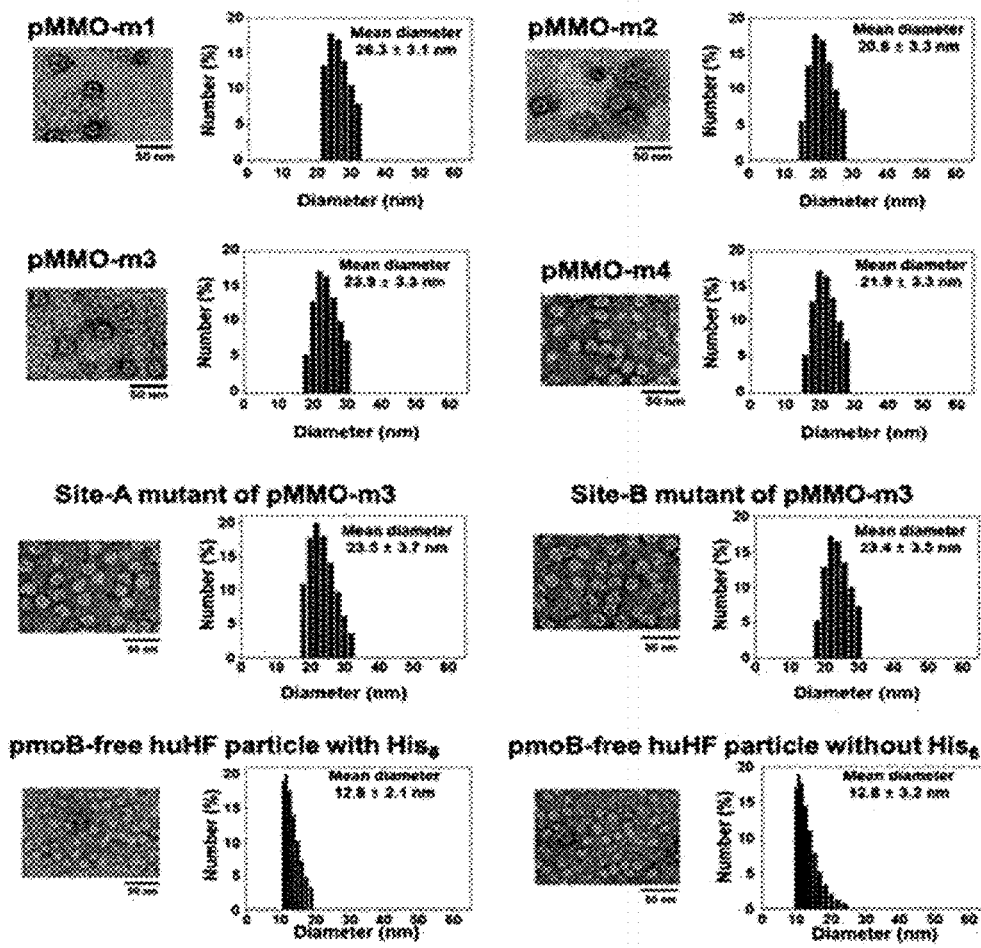
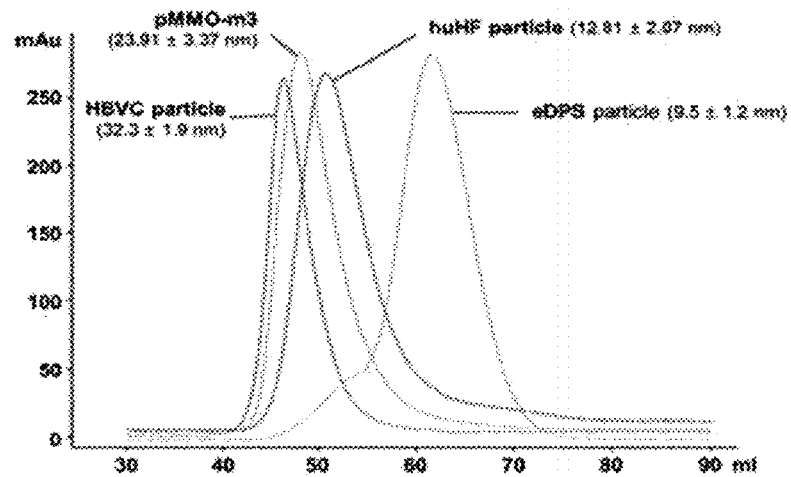

[FIG. 5]
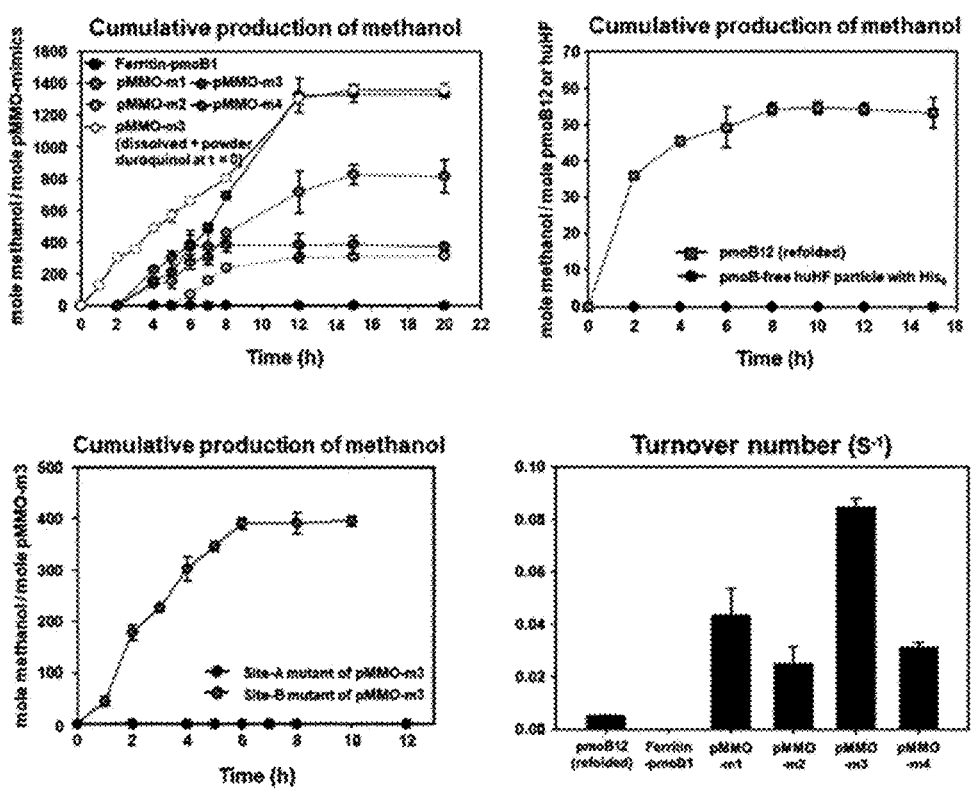

[FIG. 6]
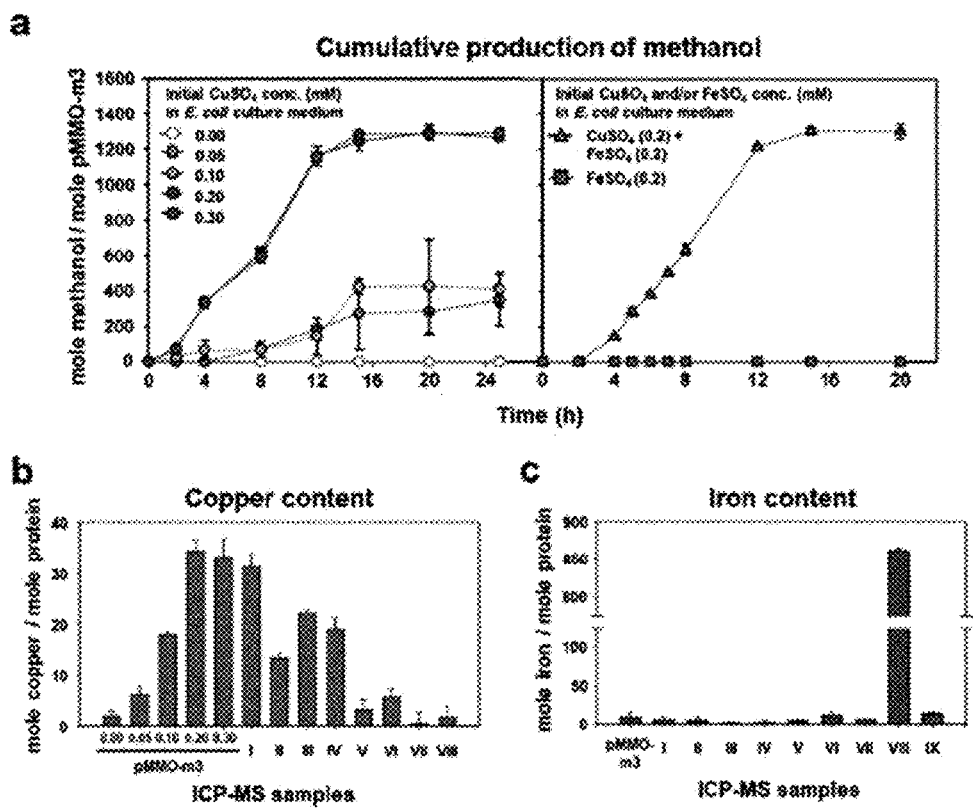

[FIG. 7]
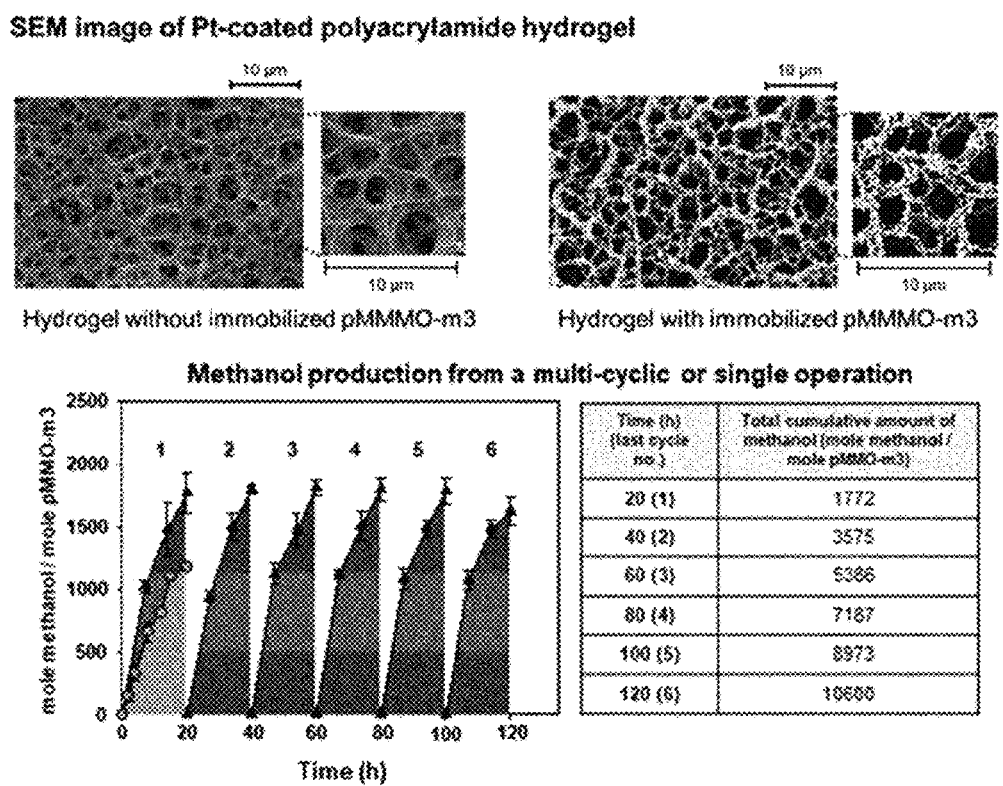

SEQUENCE LISTING

<160> NUMBER OF SEQ ID NOS: 7

<210> SEQ ID NO 1
<211> LENGTH: 172
<212> TYPE: PRT
<213> ORGANISM: Artificial Sequence
<220> FEATURE:
<223> OTHER INFORMATION: Synthetic Sequence

<400> SEQUENCE: 1

Thr Ser Gln Val Arg Gln Asn Tyr His Gln Asp Ser Glu Ala Ala Ile
1               5                   10                  15

Asn Arg Gln Ile Asn Leu Glu Leu Tyr Ala Ser Tyr Val Tyr Leu Ser
                20                  25                  30

Met Ser Tyr Tyr Phe Asp Arg Asp Asp Val Ala Leu Lys Asn Phe Ala
            35                  40                  45

Lys Tyr Phe Leu His Gln Ser His Glu Glu Arg Glu His Ala Glu Lys
    50                  55                  60

Leu Met Lys Leu Gln Asn Gln Arg Gly Gly Arg Ile Phe Leu Gln Asp
65                  70                  75                  80

Ile Gln Lys Pro Asp Cys Asp Asp Trp Glu Ser Gly Leu Asn Ala Met
                85                  90                  95

Glu Cys Ala Leu His Leu Glu Lys Asn Val Asn Gln Ser Leu Leu Glu
            100                 105                 110

Leu His Lys Leu Ala Thr Asp Lys Asn Asp Pro His Leu Cys Asp Phe
        115                 120                 125

Ile Glu Thr His Tyr Leu Asn Glu Gln Val Lys Ala Ile Lys Glu Leu
    130                 135                 140

Gly Asp His Val Thr Asn Leu Arg Lys Met Gly Ala Pro Glu Ser Gly
145                 150                 155                 160

Leu Ala Glu Tyr Leu Phe Asp Lys His Thr Leu Gly
                165                 170

<210> SEQ ID NO 2
<211> LENGTH: 140
<212> TYPE: PRT
<213> ORGANISM: Artificial Sequence
<220> FEATURE:
<223> OTHER INFORMATION: Synthetic Sequence

<400> SEQUENCE: 2

His Gly Glu Lys Ser Gln Ala Ala Phe Met Arg Met Arg Thr Ile His
1               5                   10                  15

Trp Tyr Asp Leu Ser Trp Ser Lys Glu Lys Val Lys Ile Asn Glu Thr
                20                  25                  30

Val Glu Ile Lys Gly Lys Phe His Val Phe Glu Gly Trp Pro Glu Thr
            35                  40                  45

Val Asp Glu Pro Asp Val Ala Phe Leu Asn Val Gly Met Pro Gly Pro
        50                  55                  60

Val Phe Ile Arg Lys Glu Ser Tyr Ile Gly Gly Gln Leu Val Pro Arg
65                  70                  75                  80

Ser Val Arg Leu Glu Ile Gly Lys Thr Tyr Asp Phe Arg Val Val Leu
                85                  90                  95

Lys Ala Arg Arg Pro Gly Asp Trp His Val His Thr Met Met Asn Val
            100                 105                 110

Gln Gly Gly Gly Pro Ile Ile Gly Pro Gly Lys Trp Ile Thr Val Glu
        115                 120                 125

Gly Ser Met Ser Glu Phe Arg Asn Pro Val Thr Thr
            130                 135                 140

<210> SEQ ID NO 3
<211> LENGTH: 150
<212> TYPE: PRT
<213> ORGANISM: Artificial Sequence
<220> FEATURE:
<223> OTHER INFORMATION: Synthetic Sequence

<400> SEQUENCE: 3

Gln Ala Gly Thr Met Arg Gly Met Lys Pro Leu Glu Leu Pro Ala Pro
1               5                   10                  15

Thr Val Ser Val Lys Val Glu Asp Ala Thr Tyr Arg Val Pro Gly Arg
                20                  25                  30

Ala Met Arg Met Lys Leu Thr Ile Thr Asn His Gly Asn Ser Pro Ile
            35                  40                  45

Arg Leu Gly Glu Phe Tyr Thr Ala Ser Val Arg Phe Leu Asp Ser Asp
        50                  55                  60

Val Tyr Lys Asp Thr Thr Gly Tyr Pro Glu Asp Leu Leu Ala Glu Asp
65                  70                  75                  80

Gly Leu Ser Val Ser Asp Asn Ser Pro Leu Ala Pro Gly Glu Thr Arg
                85                  90                  95

Thr Val Asp Val Thr Ala Ser Asp Ala Ala Trp Glu Val Tyr Arg Leu
            100                 105                 110

Ser Asp Ile Ile Tyr Asp Pro Asp Ser Arg Phe Ala Gly Leu Leu Phe
        115                 120                 125

Phe Phe Asp Ala Thr Gly Asn Arg Gln Val Val Gln Ile Asp Ala Pro
130                 135                 140

Leu Ile Pro Ser Phe Met
145                 150

<210> SEQ ID NO 4
<211> LENGTH: 140
<212> TYPE: PRT
<213> ORGANISM: Artificial Sequence
<220> FEATURE:
<223> OTHER INFORMATION: Synthetic Sequence

<400> SEQUENCE: 4

Asn Gly Glu Lys Ser Gln Ala Ala Phe Met Arg Met Arg Thr Ile His
1               5                   10                  15

Trp Tyr Asp Leu Ser Trp Ser Lys Glu Lys Val Lys Ile Asn Glu Thr
                20                  25                  30

```
Val Glu Ile Lys Gly Lys Phe His Val Phe Glu Gly Trp Pro Glu Thr
         35                  40                  45

Val Asp Glu Pro Asp Val Ala Phe Leu Asn Val Gly Met Pro Gly Pro
     50                  55                  60

Val Phe Ile Arg Lys Glu Ser Tyr Ile Gly Gln Leu Val Pro Arg
 65              70                  75                  80

Ser Val Arg Leu Glu Ile Gly Lys Thr Tyr Asp Phe Arg Val Val Leu
                 85                  90                  95

Lys Ala Arg Arg Pro Gly Asp Trp Ala Val Ala Thr Met Met Asn Val
                100                 105                 110

Gln Gly Gly Gly Pro Ile Ile Gly Pro Gly Lys Trp Ile Thr Val Glu
            115                 120                 125

Gly Ser Met Ser Glu Phe Arg Asn Pro Val Thr Thr
            130                 135                 140

<210> SEQ ID NO 5
<211> LENGTH: 140
<212> TYPE: PRT
<213> ORGANISM: Artificial Sequence
<220> FEATURE:
<223> OTHER INFORMATION: Synthetic Sequence

<400> SEQUENCE: 5

His Gly Glu Lys Ser Gln Ala Ala Phe Met Arg Met Arg Thr Ile Asn
 1               5                  10                  15

Trp Tyr Asp Leu Ser Trp Ser Lys Glu Lys Val Lys Ile Asn Glu Thr
                 20                  25                  30

Val Glu Ile Lys Gly Lys Phe Asn Val Phe Glu Gly Trp Pro Glu Thr
                 35                  40                  45

Val Asp Glu Pro Asp Val Ala Phe Leu Asn Val Gly Met Pro Gly Pro
     50                  55                  60

Val Phe Ile Arg Lys Glu Ser Tyr Ile Gly Gly Gln Leu Val Pro Arg
 65              70                  75                  80

Ser Val Arg Leu Glu Ile Gly Lys Thr Tyr Asp Phe Arg Val Val Leu
                 85                  90                  95

Lys Ala Arg Arg Pro Gly Asp Trp His Val His Thr Met Met Asn Val
                100                 105                 110

Gln Gly Gly Gly Pro Ile Ile Gly Pro Gly Lys Trp Ile Thr Val Glu
            115                 120                 125

Gly Ser Met Ser Glu Phe Arg Asn Pro Val Thr Thr
            130                 135                 140

<210> SEQ ID NO 6
<211> LENGTH: 15
<212> TYPE: DNA
<213> ORGANISM: Artificial Sequence
<220> FEATURE:
<223> OTHER INFORMATION: linker

<400> SEQUENCE: 6
gggsgggtgg gsggg                                                15
```

```
<210> SEQ ID NO 7
<211> LENGTH: 6
<212> TYPE: PRT
<213> ORGANISM: Artificial Sequence
<220> FEATURE:
<223> OTHER INFORMATION: linker

<400> SEQUENCE: 7

Gly Lys Leu Gly Gly Gly
1               5
```

ENZYME NANOPARTICLES WITH METHANE OXIDATION ACTIVITY

CROSS REFERENCE TO RELATED APPLICATIONS

This application is a U.S. National Stage Application of International Application No. PCT/KR2020/003841, filed on Mar. 20, 2020, which claims the benefit under 35 USC 119(a) and 365(b) of Korean Patent Application No. 10-2019-0036923, filed on Mar. 29, 2019, in the Korean Intellectual Property Office, the entire disclosure of which is incorporated herein by reference for all purposes.

INCORPORATION-BY-REFERENCE OF MATERIAL SUBMITTED BY U.S.P.T.O. EFS-WEB

The instant application contains a Sequence Listing which is being submitted in computer readable form via the United States Patent and Trademark Office eFS-WEB system and which is hereby incorporated by reference in its entirety for all purposes. The txt file submitted herewith contains a 6,993 bytes file, which was created on Jun. 26, 2023 (OA20230413_0182000001_SequenceListing.txt).

TECHNICAL FIELD

The present invention relates to novel enzyme nanoparticles capable of converting methane into methanol, in which key active sites of methane-oxidizing bacteria are fused with each other and expressed on a protein that can be self-assembled in cells to form nanoparticles, and specifically to enzyme nanoparticles including a protein having methane monooxygenase (MMO) (also referred to as "methane oxidase") activity and active sites of the methane oxidase, a method for production thereof, a recombinant microorganism into which a nucleic acid encoding the protein and the active site of the methane oxidase is introduced, immobilized enzyme nanoparticles including the enzyme nanoparticles loaded on a carrier, and a method for converting methane into methanol using the same.

BACKGROUND ART

Methane gas is a major component of shale gas, landfill gas, biogas, etc., which is the most abundant gas resource on the planet and a raw material for production of methanol. Currently, hydrocarbons used as various household goods or major industrial materials are produced from crude oil as a raw material, however, most of them can also be produced from methanol, such that methanol has attracted attention as a raw material for producing hydrocarbons that can replace the crude oil.

Until now, methanol has been industrially produced through chemical oxidation of methane gas, however, such a methane oxidation process entails a number of problems in technical, economical and environmental aspects such as high energy consumption due to high temperature and high pressure reaction conditions, environmental pollution due to generation of reaction by-products, low reaction conversion rate due to low reaction selectivity and the like.

As an alternative idea to solve these problems, global attention has been focused on bio-processes that utilize methane monooxygenase (MMO) derived from methane-oxidizing bacteria (methanotrophs). In particular, methane oxidase, which exists in the form of a membrane protein, is an enzyme that selectively converts most of methane gas into methanol without generation of by-products even under very mild conditions (45° C., atmospheric pressure) compared to chemical oxidation processes. Methane monooxygenase (MMO), which exists in particulate form (particulate: pMMO) or soluble form (soluble: sMMO) in methanolotrophic bacteria, is an industrially promising enzyme that catalyzes oxidation of low reactive methane and other carbon materials to methanol and its corresponding oxidation products. However, despite culture of natural methanotrophs or various approaches based on one of recombinant expression systems, easy, fast and high-yield production of active MMOs is still a big challenge for its industrial application.

Both the water-soluble form, that is, sMMO expressed in some methanotrophs and the more common membrane-bound particle form, that is, pMMO have been widely studied to realize their potential for bio-industrial production, but any result demonstrating that functionally active MMOs can be produced easily, quickly and in high yield has not yet been reported.

Further, since particulate methane monooxygenase (pMMO), which is a kind of membrane proteins, is also highly technically difficult in terms of mass production, no successful development cases have been reported despite intensive global research.

This is mainly because the proliferation of natural methanotrophs is quite slow and the cell density is also very low. Due to such restrictions, production has been attempted using fast-growing strains, such as E. coli, which enable excellent production of recombinant proteins on an industrial scale (Islam, R. S., Tisi, D., Levy, M. S. & Lye, G. J. Biotechnol. Bioeng. 99, 1128-1139 (2008)).

However, the production of recombinant sMMO or pMMO in such E. coli is not actually an active form of MMO, and an additional cumbersome process is required to prepare a structural form exhibiting catalytic action.

In this regard, there is a need for a recombinant system capable of synthesizing enzyme nanoparticles in high yield while maintaining a structure having a catalytic function through optimized gene expression in order to express heterologous enzymes in E. coli.

Under this technical background, the inventors of the present application have made extensive efforts to design pMMO that is structurally and functionally active using ferritin protein nanoparticles as a scaffold, consequentially, have found that new enzyme nanoparticles capable of converting methane into methanol by performing fusion and expression of key active sites of methane oxidizing bacteria into protein nanoparticles could be prepared, and therefore, the present invention has been completed on the basis of the finding.

SUMMARY OF INVENTION

Problems to be Solved by Invention

An object of the present invention is to provide enzyme nanoparticles having methane monooxygenase (MMO) activity.

In addition, another object of the present invention is to provide a recombinant microorganism having enzyme nanoparticle generation ability that exhibits MMO activity by fusion and expression of a first active site and a second active site of the methane oxidase on a surface of protein nanoparticles.

Further, another object of the present invention is to provide a method for production of enzyme nanoparticles using the recombinant microorganism.

Further, another object of the present invention is to provide immobilized enzyme nanoparticles including the enzyme nanoparticles loaded on a carrier, and a method for production thereof.

Furthermore, another object of the present invention is to provide a method for converting methane into methanol using the enzyme nanoparticles.

Means for Solving Problems

In order to achieve the above objects, the present invention provides an enzyme nanoparticle having methane oxidase activity, wherein a first active site and a second active site of the methane oxidase are fused with each other and expressed on a surface of a protein adapted to be self-assembled in cells to form nanoparticles.

Further, the present invention provides a recombinant microorganism having enzyme nanoparticle production ability, into which: i) a nucleic acid encoding a protein adapted to be self-assembled in cells to form nanoparticles; ii) a nucleic acid encoding a first active site of a methane oxidase; and iii) a nucleic acid encoding a second active site of the methane oxidase, are introduced, and wherein the first active site and the second active site are fused with each other and expressed on a surface of protein nanoparticles to exhibit MMO activity.

Further, the present invention provides a method for production of enzyme nanoparticles, which includes: generating nanoparticles having methane monooxygenase (MMO) ("methane oxidase") activity by culturing the recombinant microorganism, wherein a first active site and a second active site of the methane oxidase are fused with each other and expressed on the surface of a protein adapted to be self-assembled in cells to form nanoparticles; and recovering the generated nanoparticles.

Further, the present invention provides immobilized enzyme nanoparticles including the enzyme nanoparticles loaded on a carrier.

Moreover, the present invention may provide a method for converting methane into methanol using the enzyme nanoparticles, the recombinant microorganism, or the immobilized enzyme nanoparticles.

BRIEF DESCRIPTION OF DRAWINGS

FIG. 1 illustrates specific examples of vectors for expression of protein nanoparticles.

FIG. 2 illustrates effects of copper salts on the expression of a recombinant protein.

FIG. 3 illustrates results of analyzing the expression rate and cytoplasmic solubility of the recombinant protein.

FIG. 4 illustrates results of observing protein nanoparticle images using an electron microscope.

FIG. 5 illustrates measured results of an amount of methanol, which is an oxidation product produced by an enzymatic reaction.

FIG. 6 illustrates results of confirming effects of protein nanoparticles on metal content and catalytic activity.

FIG. 7 illustrates results of proving that repetitive methane oxidation activity can be expressed by applying hydrogel containing immobilized pMMO-m3.

MODE FOR CARRYING OUT INVENTION

Unless otherwise defined, all technical and scientific terms used in this specification have the same meaning as commonly understood by an expert skilled in the art, to which the present invention pertains ("those skilled in the art"). In general, the nomenclature used in this specification is well known and commonly used in the art.

The inventors of the present application have found a recombinant system that can synthesize enzyme nanoparticles, which include a first active site (pmoB1) or its variant of a methane oxidase as a heterologous enzyme and a second active site (pmoB2) of the methane oxidase, with high yield, while maintaining a structure having a catalytic function in $E.\ coli$, by using a protein adapted to be self-assembled in cells to form nanoparticles such as ferritin heavy chain protein (huHF).

Specifically, under control of one promoter, a system including: a first vector that operatively links a nucleic acid encoding huHF and a nucleic acid encoding pmoB1 and pmoB2, which are active sites of pMMO, or operatively links the nucleic acid encoding huHF and a nucleic acid encoding pmoB1 or a variant thereof; and a second vector that operatively links the nucleic acid encoding huHF and a nucleic acid encoding pmoB2, was constructed. For example, referring to FIG. 1, as shown in (a) to (i), the system was progressed in the order of pT7-pmoB12, pT7-huHF-pmoB1, pT7-pMMO-m1, pET28a-pMMO-m2-B1, pT7-pMMO-m2-B2, pET28a-pMMO-m3-B1, pT7-pMMO-m3-B2, pET28a-Mut-A-m3-B1, pT7-Mut-A-m3-B2, pET28a-Mut-B-m3-B1, pT7-Mut-B-m3-B2, pET28apMMO-m4-B1(R), pT7-pMMO-m4-B2, pT7-pMMO-m4-B2, pT7-huFH and pT7-D4K-huHF (FIG. 1).

As a result of introducing these vectors into host cells and culturing the same, it was confirmed that the enzyme nanoparticles were successfully expressed. The enzyme nanoparticles are those in which pmoB1 and pmoB2 are fused with and expressed in a ferritin scaffold that formed heterodimeric nanoparticles through self-assembly in cells, and it was confirmed that enzyme nanoparticles are expressed with high efficiency and MMO activity is exhibited, thereby producing methanol by oxidizing methane through an enzymatic reaction.

Therefore, in one aspect, the present invention relates to an enzyme nanoparticle having methane monooxygenase (MMO) activity, wherein a first active site and a second active site of the methane oxidase are fused with each other and expressed on the surface of a protein adapted to be self-assembled in cells to form nanoparticles.

In another aspect, the present invention relates to a recombinant microorganism having enzyme nanoparticle generation ability, into which: i) a nucleic acid encoding a protein adapted to be self-assembled in cells to form nanoparticles: ii) a nucleic acid encoding a first active site of a methane oxidase; and iii) a nucleic acid encoding a second active site of the methane oxidase are introduced, wherein MMO activity is exhibited by fusion and expression of the first active site and the second active site on the surface of the protein nanoparticles.

In another aspect, the present invention relates to a method for production of enzyme nanoparticles, which includes: generating nanoparticles having methane oxidase activity by culturing the recombinant microorganism, wherein a first active site and a second active site of the methane oxidase are fused with each other and expressed on the surface of a protein adapted to be sell-assembled in cells to form nanoparticles; and recovering the generated nanoparticles.

In the present invention, the methane oxidase may be an active membrane enzyme that includes a periplasmic catalytic domain present in the membrane bilayer through transmembrane a-helices, and it was confirmed that, when constructing a molecular environment similar to transmembrane o-helices present in natural membranes, the methane oxidase of the present invention could be rearranged into a desired structure while maintaining the catalytic activity thereof.

In this respect, the protein may function as a support capable of providing the molecular environment similar to a trans membrane, and may be used without limitation as long as it can be self-assembled in cells to form nanoparticles. For example, ferritin, ferritin-like protein, magnetosome constituent protein, *Escherichia coli* DNA binding protein, human a-tocopherol transfer protein, human PERK chaperone, hepatitis B virus capsid protein, proteosome, or tobacco mosaic virus coat protein may be used.

In particular, ferritin may be used as the protein, and in a specific embodiment according to the present invention, ferritin may be subjected to a self-assembly of 24 protein monomers having a molecular weight of 21 kDa to form spherical nanoparticles having a diameter of about 12 nm. Ferritin may have a molecular weight of about 500,000 Da, may consist of 24 identical protein subunits composed of heavy and light chains, and may form a hollow shell in vivo. The protein bound to iron may have iron storage and iron detoxification functions. The protein may function as a cytoprotective protein that maintains iron balance in cells for the growth and survival of most tissues and minimizes a formation of oxygen-free radicals due to the binding of iron in the cells.

Full-length ferritin, ferritin heavy chain or ferritin light chain may be used to produce nanoparticles, but preferably ferritin heavy chain protein may be used. Specifically, it was confirmed that, when using the heavy chain protein of ferritin, it might function as a support (i.e., scaffold) capable of providing the molecular environment similar to that of a trans membrane, and may have self-assembly ability to form spherical particles. Enzyme nanoparticles (pMMO-mimics) were prepared using ferritin heavy chain protein (huHF) as an active site introduction agent of methane oxidase, wherein the huHF may be expected to have optimum efficacy when a heterogeneous material is fused due to site-specific expression.

The enzyme nanoparticles having methane oxidation activity according to the present invention was prepared by introducing an active site of a methane oxidase at a specific position (C-terminal) on the surface of ferritin protein nanoparticles. The C-terminal portion of ferritin forms a 4-fold axis (a structure where four axes are gathered), while the introduction of a foreign protein such as pmoB1 or pmoB2 to the above portion has an advantage of enabling the surface of the introduction agent to be expressed.

The nanoparticles (pMMO-mimics) of the present invention are recombinant protein nanoparticles formed by self-assembly and exhibit a uniform distribution of active sites of the methane oxidase. Nanoparticles (pMMO-mimics) according to the present invention may have a diameter of about 20 to 26 nm.

A new form of enzyme nanoparticles having methane oxidation activity may be produced by the recombinant microorganism according to the present invention, wherein key active sites of microfine methane oxidase existing on a cellular membrane of methane-oxidizing bacteria are genetically expressed on the surface of human ferritin heavy chains which are nanoparticles composed of protein. The nanoparticles according to the present invention demonstrate activity of actually converting methane gas into methanol through the injection of methane gas.

The methane oxidase needs to identify the smallest structural unit for activation. At this time, it should be necessary to include the minimum methane oxidase unit while providing a desirable binding site using a catalytically inactivated and structurally stable scaffold, while the active methane oxidase unit needs to be structurally maintained in the re-constructed form in order to keep catalytic activity.

Methane monooxygenase (MMO) has an $\alpha 3\beta 3\gamma 3$ quaternary structure, wherein $\alpha\beta\gamma$ three subunits are named pmoB, pmoA and pmoC, respectively. Two water-soluble periplasmic domains of pmoB (pmoB1 and pmoB2) are connected by two transmembrane a helices (TH$\alpha$1 and TH$\alpha$2). There is a controversy about the active site of pMMO, but now the peripheral cytoplasmic domain of pmoB is generally known as the active site.

In this aspect, the first active site and the second active site of the methane oxidase may be selected from the group consisting of pmoB1 or a variant thereof and pmoB2 or a variant thereof, and the first active site and the second active site may be different from each other.

Specifically, the first active site of the methane oxidase may be pmoB1 or a variant thereof, and the second active site may be pmoB2 or a variant thereof. In the present invention, the pmoB1 and pmoB2 were used as active sites for production of the enzyme nanoparticles. The first active site of the methane oxidase may include the sequence of SEQ ID NO: 2, while the second active site of the methane oxidase may include the sequence of SEQ ID NO: 3. The pmoB1 and pmoB2 were recombined on the scaffold replacing the transmembrane TH$\alpha$1 and TH$\alpha$2 of pmoB.

However, pmoA and/or pmoC, which are subunits other than pmoB of methane oxidase, may be included as an active site, and in some cases, pmoB1 or a variant thereof. Further, the second active site may use pmoA and/or pmoC replacing the pmoB2 or a variant thereof.

The variant may include one or more selected from the group consisting of H33N, E135Q, H137A, H139A, H48N, and H72N. According to a specific embodiment of the present invention, as the variant of pmoB1, a variant of site-A mutant m3 pmoB1 (H33N, H137A, and H139A) or a variant of site-B mutant m3 pmoB1 (H48N, and H72N) may be included. The variant of pmoB1 may include the sequence of SEQ ID NO: 4 or SEQ ID NO: 5.

As a scaffold, apo-type ferritin protein that does not contain iron while having a nano-scale in the form of a spherical cage composed of 24 identical units may be used. Each ferritin subunit contains four anti-parallel alpha helix huHFA to huHFD and a c-terminal alpha helix, that is, huHFE, wherein the huHFE may be used as a conjugation site for pmoB1 and pmoB2.

In order to fuse and express the first active site and the second active site on the surface of the protein nanoparticle, a vector to which: i) the nucleic acid encoding the protein adapted to be self-assembled in cells to form nanoparticles; ii) the nucleic acid encoding the first active site of the methane oxidase; and iii) the nucleic acid encoding the second active site of the methane oxidase are operatively linked may be introduced. Specifically, a nucleic acid encoding a ferritin heavy chain protein, a nucleic acid encoding pmoB1 or a variant thereof, and a nucleic acid encoding pmoB2 or a variant thereof are operatively linked to one vector, whereby ferritin nanoparticles with pmoB1 and pmoB genetically expressed on the surface thereof may be produced.

Further, (a) a first vector to which i) the nucleic acid encoding the protein adapted to be self-assembled in cells to form nanoparticles, and ii) the nucleic acid encoding the first active site of the methane oxidase are operatively linked; and (b) a second vector to which ii) the nucleic acid encoding the protein adapted to be self-assembled in cells to form nanoparticles, and iii) the nucleic acid encoding the second active site of the methane oxidase are operatively linked may be introduced.

Specifically, a first vector to which: a nucleic acid encoding a ferritin heavy chain protein; a nucleic acid encoding pmoB1 or a variant thereof; and a nucleic acid encoding pmoB2 or a variant thereof are operatively linked, or to which a nucleic acid encoding a ferritin heavy chain protein and a nucleic acid encoding pmoB1 or a variant thereof are operatively linked; as well as a second vector to which a nucleic acid encoding a ferritin heavy-chain protein and a nucleic acid encoding pmoB2 or a variant thereof are operatively linked may be introduced, whereby ferritin nanoparticles with pmoB1 and pmoB2 genetically expressed on the surface thereof may be produced.

In one embodiment, the recombinant microorganism may further include a nucleic acid encoding a peptide linker between i) the nucleic acid encoding the protein adapted to be self-assembled in cells to form nanoparticles and ii) the nucleic acid encoding the first active site of the methane oxidase, or between ii) the nucleic acid encoding the first active site of the methane oxidase and iii) the nucleic acid encoding the second active site of the methane oxidase.

According to a specific embodiment of the present invention, a nucleic acid sequence having the sequence of SEQ ID NO: 6 or a peptide sequence having the sequence of SEQ ID NO: 7 may be included as a linker. When expressed in the presence of one promoter, the peptide sequence having the sequence of SEQ ID NO: 7 is included as a linker between the nucleic acid encoding a ferritin heavy-chain protein and the nucleic acid encoding pmoB1 or a variant thereof. Further, the nucleic acid sequence having the sequence of SEQ ID NO: 6 may be included as a linker between the nucleic acid encoding pmoB1 and the nucleic acid encoding pmoB2. Further, when using two vectors, a the nucleic acid sequence having the sequence of SEQ ID NO: 6 may be included between the nucleic acid encoding a ferritin heavy chain protein and the nucleic acid encoding pmoB1 or a variant thereof.

The term "operatively linked" refers to a functional linkage between a regulatory sequence associated with nucleic acid expression (e.g., a promoter, a signal sequence, or a transcriptional regulatory factor, etc.) and another nucleic acid, whereby the regulatory sequence may regulate transcription and/or translation of the another nucleic acid.

Suitable molecules (e.g., transcriptional activating proteins) may be nucleic acids and regulatory sequence(s) that are bound to the regulatory sequence(s) in a manner of enabling nucleic acid expression. For example, a nucleic acid for a pre-sequence or secretion leader is operatively linked to a nucleic acid for a polypeptide when expressed as a pre-protein that participates in secretion of the polypeptide: a promoter or enhancer is operatively linked to a coding sequence if it affects sequence transcription; a ribosome binding site is operatively linked to a coding sequence if it affects the sequence transcription; or the ribosome binding site is operatively linked to the coding sequence if arranged to facilitate translation.

In general, the term "operatively linked" means that the linked nucleic acid sequence is in contact, and specifically, is in contact and is present inside a reading frame in the case of a secretion leader. However, the enhancer does not need to contact. Connection between these sequences is performed by ligation (linkage) at convenient restriction enzyme sites. If such a site does not exist, a synthetic oligonucleotide adapter or linker according to the conventional method is used. In the present invention, it means that the nucleic acid sequence is operatively linked, such that the first active site and the second active site of the methane oxidase can be fused with each other and expressed on the surface of the protein nanoparticle.

Specifically, the ferritin protein nanoparticles in which the active sites (pmoB1, and pmoB2) of the methane oxidase according to the present invention are fused may be produced by a manufacturing method which includes: a) obtaining a gene clone derived from a nucleic acid encoding a ferritin protein; b) obtaining a gene clone derived from a nucleic acid encoding active sites (pmoB1, and pmoB2) of the methane oxidase to be expressed on the surface of the ferritin protein; c) preparing an expression vector through ligation of the prepared gene clones; and d) expressing recombinant enzyme nanoparticles (pMMO-mimics) by transforming the expression vector into a host.

Vectors used for over-expression of nucleic acids may be any expression vector known in the art. The term "vector" is used to refer to DNA fragment(s), nucleic acid molecules, etc., which are delivered into cells. The vectors replicate DNA and may be reproduced independently in host cells. The term "carrier" is often used interchangeably with the "vector." The term "expression vector" refers to a recombinant DNA molecule including a coding sequence of interest and an appropriate nucleic acid sequence essential for expressing the coding sequence operatively linked in a specific host organism.

The expression vector may be used in the form compatible with the host cell, and may include, for example, BLUESCRIPT vector (Stratagene), T7 expression vector (Invitrogen), pET vector (Novagen), etc., but it is not limited thereto.

The expression vector preferably includes one or more selectable markers. The marker is typically a nucleic acid sequence having a characteristic that the marker can be selected by a chemical method, and any nucleic acid capable of distinguishing a transformed cell from a non-transgenic cell may be applicable. For example, antibiotic-tolerant nucleic acids such as kanamycin, G418, bleomycin, hygromycin, chloramphenicol, etc. may be included, but it is not limited thereto.

The vector may include a promoter. The term "promoter" means a region of DNA upstream from a structural nucleic acid and refers to a DNA molecule to which an RNA polymerase is bound to initiate transcription. The promoter according to the present invention is a promoter capable of initiating transcription in a host, for example, $E.\ coli$, and may include lac, trp, tac, $\lambda PL$, T7, etc. for protein expression in the host, but it is not limited thereto.

The nucleic acid may be linked to a tag for isolation and/or purification or a nucleic acid sequence encoding the tag. As an example, the tag may be appropriately selected from the group consisting of small peptide tags such as His tag, Flag tag, S tag, etc., glutathione S-transferase (GST) tag, maltose binding protein (MBP) tag, or the like, but it is not limited thereto.

Since an expression amount and modification of protein differ depending on the host cell of the recombinant microorganism, the most suitable host cell for the purpose may be selected and used. The host cell may include prokaryotic host cells such as *E. coli* (*Escherichia coli*) *Bacillus subtilis*, *Streptomyces*, *Pseudomonas*, *Proteus mirabilis* or *Staphylococcus*, but it is not limited thereto. Further, lower eukaryotic cells such as lungi (e.g., *Aspergillus*), yeast (e.g., *Pichia*

*pastoris*), *Saccharomyces cerevisiae*, *Schizosaccharomyces, Neurospora crassa*, etc., insect cells, plant cells, cells derived from higher eukaryotes mammals, or the like may be used as host cells.

In the present invention, as an introduction method into the host cells, a commonly known genetic manipulation method may be used. Further, non-viral delivery methods may include cell puncturing, lipofection, microinjection, a ballistic method, virosome, liposome, immunoliposome, multivalent cation or lipids: nucleic acid conjugates, naked DNA, artificial virons and chemical-promoting DNA influx or the like. Sonoporation, for example, a method with Sonitron 2000 system (Rich-Mar) may also be used for delivery of nucleic acids, and other representative nucleic acid delivery systems may include methods with use of Amaxa Biosystems (Cologne, Germany), Maxcyte, Inc. (Rockville, Maryland) and BTX Molecular Delivery System (Holliston, MA).

According to the present invention, the active sites (pmoB1, and pmoB2) of methane oxidase are introduced in series or parallel to ferritin c-terminal so that the active sites on the surface of ferritin particles may be genetically re-assembled. This enabled mass production of the enzyme nanoparticles having activity by *E. coli*.

Meanwhile, the inventors of the present application have constructed a new reaction system by immobilizing the enzyme nanoparticles on a three-dimensional porous hydrogel, and have demonstrated that the activity of the enzyme nanoparticles due to water content of the hydrogel is maintained for a long period of time to allow the enzyme nanoparticles to be repeatedly used. In a specific example according to the present invention, a new enzymatic reaction system has been developed, in which enzyme nanoparticles are immobilized and evenly distributed inside porous hydrogel. It could be seen that the hydrogel-based reaction system may not only include a large amount of enzyme nanoparticles in a certain volume of space, but also reuse the activity of the nanoparticles stably and repeatedly for a long period of time due to excellent water retention ability of the hydrogel.

Accordingly, in another aspect, the present invention relates to immobilized enzyme nanoparticles including the enzyme nanoparticles loaded on a carrier, and specifically, to immobilized enzyme nanoparticles in which the enzyme nanoparticles are encapsulated in a polymer and uniformly distributed therein.

Further, the present invention relates to a method for production of immobilized enzyme nanoparticles, which includes: reacting enzyme nanoparticles with a polymer, wherein the enzyme nanoparticles are loaded on a carrier, for example, encapsulated in the polymer so as to be uniformly distributed therein.

The carrier may include chitosan, gelatin, collagen, poly-L-lysine, poly-L-histidine, poly-L-arginine, hyaluronic acid, polygamma-glutamic acid, alginate, carboxymethyl cellulose, glycogen, amylose, dextran, poly acrylic acid, polyacrylamide, polymethacrylic acid, polyhydroxyethyl methacrylate fluran, beta glucan, starch, hydroxyethyl cellulose, carboxymethyl cellulose, polyvinylpyrrolidone, polyvinylpyrrolidone copolymer, polyethyleneglycol, polyvinylalcohol, polyvinylalkylether, polydimethylaminoethyl methacrylate, poly N,N-ethylaminoethyl methacrylate, polylactic acid, glycolic acid, polylactic glycolic acid or polycaprolactone, but it is not limited thereto.

The carrier loaded with the enzyme nanoparticles may react the enzyme nanoparticles with the carrier by any conventional method, thereby preparing the carrier encapsulated and loaded with the enzyme nanoparticles.

For example, a solution containing enzyme nanoparticles may be added to a polymer free of moisture to swell the same so as to load the enzyme nanoparticles on the polymer; enzyme nanoparticles may be added to a polymer solution and mixed, followed by further reacting the mixture with a crosslinking agent so as to load the enzyme nanoparticles on the polymer; otherwise, a functional group may be introduced into a terminal of the enzyme nanoparticle, followed by polymerization of the enzyme nanoparticles, into which the functional groups are introduced, with polymer monomers, thereby loading the enzyme nanoparticles on the polymer, but it is not limited thereto.

The crosslinking agent is not particularly limited to triphosphate as long as it is a material capable of binding enzyme nanoparticles among polymers, and may include, for example, sodium, sodium citrate, sodium oxalate, sodium pyrophosphate, sodium sulfate, sodium tartrate, sodium malate, sodium malonate, sodium methylene diphosphate, potassium citrate, potassium oxalate, potassium pyrophosphate, potassium sulfate, potassium tartrate, potassium malate, potassium malonate, epichlorohydrin, epibromohydrin, or criethylenetetraamine, but it is not limited thereto.

In one embodiment according to the present invention, a polymer-based hydrogel, in which the enzyme nanoparticles were immobilized and uniformly distributed, may be prepared. Specifically, a functional group, for example, a vinyl group, an acrylic group or an acrylic group unsubstituted or substituted with alkyl having 1 to 30 carbon atoms, for example, 1 to 6 carbon atoms, was introduced into the terminal of the enzyme nanoparticle, thereby allowing the terminal of the enzyme nanoparticle to be substituted with the above functional group.

The enzyme nanoparticles to which the functional groups are bound may be subjected to polymerization with polymer monomers, for example, polymeric monomers such as acrylic acid, acrylamide, hydroxyethyl methacrylate, ethylene glycol, N,N-ethylaminoethyl methacrylate, hyaluronic acid or chitosan. For example, an amine group expressed on the surface of the enzyme nanoparticles may react with N-succinimidylacrylate (NSA) to prepare enzyme nanoparticles having vinyl groups enabling polymerization.

Meanwhile, the inventors of the present application have confirmed that, as a result of reaction of methane gas through the enzyme nanoparticles, methanol, which is an oxidation product of methane, was generated by an enzymatic reaction, followed by measuring a production amount and determining a cumulative production amount and a turnover number as shown in FIG. 5.

Accordingly, the present invention relates to a method for converting methane to methanol using the enzyme nanoparticles, the recombinant microorganism, or the immobilized enzyme nanoparticles.

EXAMPLE

Hereinafter, the present invention will be described in more detail by means of examples. These examples are for illustrative purposes only, and it will be apparent to those skilled in the art that the scope of the present invention is not construed as being limited by these examples.

[Example 1] Preparation of Expression Vector for Biosynthesis of pMMO-Mimics Enzyme Nanoparticles PmoB12, ferritin-pmoB1, pMMO-mimics (pMMO-m1 to pMMO-m4), site-A mutant of pMMO-m3, site-B mutant of pMMO-m3, pmoB-free huHF particles with His6 and pmoB-free huHF particles without His6 were prepared according to the vector schematic diagram described in Table 1 below. All plasmid expression vectors prepared as described above were purified in agarose gel, followed by confirming a sequence through complete DNA sequencing.

The resulting PCR products were sequentially inserted into vectors for expression of pT7-7 and pET28a (Novagen, U.S.A.) to construct expression vectors capable of expressing protein nanoparticles, respectively.

Vectors for expression of different protein nanoparticles have proceeded with pT7-pmoB12, pT7-huHF-pmoB1, p17-pMMO-m1, pET28a-pMMO-m2-B1, pT7-pMMO-m2-B2, pET28a-pMMO-m3-B1, pT7-pMMO-m3-B2, pET28a-Mut-A-m3-B1, pT7-Mut-A-m3-B2, pET28a-Mul-B-m3-B1, pT7-Mut-B-m3-B2, pET28apMMO-m4-B1(R), pT7-pMMO-m4-B2, pT7-huFH and pT7-D4K-huHF, respectively (FIG. 1).

[Example 2] Biosynthesis (Except for pmoB12) and Purification of Recombinant Protein Including pMMO-Mimmics

*E. coli* strain BL21 (DE3) [F⁻omp ThsdS$_B$ (rB⁻mB⁻)] was transformed using the prepared expression vectors, respectively. In particular, pMMO-m2, pMMO-m3, site-A mutant of pMMO-m3, site-B mutant of pMMO-m3, pMMO-m4 allowed two expression vectors to be simultaneously transformed on *E. coli* strain BL21, and a transformant resistant to ampicillin and kanamycin was selected. Transformed *E. coli* were cultured in a flask including 50 mL of Luria-Bertani (LB) medium (containing 100 mgL⁻¹ ampicillin, 100 mgL⁻¹ kanamycin and 0.2 mM $CuSO_4$) (250 mL Erlenmeyer flasks, 37° C., 150 rpm). Other protein nanoparticles (ferritin-pmoB1, pMMO-m1, pmoB-free huHF particles with Hiss and pmoB-free huHF particles without Hiss) except for the above were selected for ampicillin-resistant transformants. The transformed *E. coli* were cultured in a flask (250 mL Erlenmeyer flasks, 37° C., 150 rpm) including 50 mL of Luria-Bertani (LB) medium (containing 100 mg

TABLE 1

| Recombinant protein | Expression vector |
|---|---|
| pmoB12 | NH$_2$-Ndel-H$_6$-pmoB1(H33-172)-S$_2$(GKLGGG)-pmoB2(Q265-M414)-HindIII-COOH |
| ferritin-pmoB1 | NH$_2$-Ndel-H$_6$-huHF-BamHI-pmoB1-HindIII-COOH |
| pMMO-m1 | NH$_2$-Ndel-H$_6$-huHF-BamHI-pmoB1-S$_2$-pmoB2-HindIII-COOH |
| pMMO-m2 | 1. NH$_2$-Ndel-huHF-BamHI-pmoB1-HindIII-COOH<br>2. NH$_3$-Ndel-H$_6$-huHF-BamHI-pmoB2-HindIII-COOH |
| pMMO-m3 | 1. NH$_2$-Ndel-huHF-S$_1$(G3SG3TG3SG3)-BamHI-pmoB1-HindIII-COOH<br>2. NH$_2$-Ndel-H$_6$-huHF-BamHI-pmoB2-HindIII-COOH |
| site-A mutant of pMMO-m3 | 1. NH$_2$-Ndel-huHF-S$_2$-BamHI-pmoB1(H33N, H137A, H139A)-HindIII-COOH<br>2. NH$_3$-Ndel-H$_6$-huHF-BamHI-pmoB2-HindIII-COOH |
| site-B mutant of pMMO-m3 | 1. NH$_2$-Ndel-huHF-S$_2$-BamHI-pmoB1(H48N, H72N)-HindIII-COOH<br>2. NH$_2$-Ndel-H$_6$-huHF-BamHI-pmoB2-HindIII-COOH |
| pMMO-m4 | 1. NH$_2$-Ndel-huHF-BamHI-pmoB1(R)-HindIII-COOH<br>2. NH$_2$-Ndel-H$_6$-huHF-BamHI-pmoB2-HindIII-COOH |
| pmoB-free huHF particles with His$_6$ | NH$_2$-Ndel-H$_6$-huHF-HindIII-COOH |
| pmoB-free huHF particles without His$_6$ | NH$_2$-Ndel-H$_6$-D4K-HuHF-HindIII-COOH |

| Name | Sequence | No. |
|---|---|---|
| ferritin | TSQVRQNYHQDEAAINRQINLELYASYVYLSMSYYFDRDDVALKNF AKYFLHQSHEEREHAEKLMKLQNQRGGRIFLQDIQKPDCDDWESGLN AMECALHLEKNVNQSLLELHKLATDKNDPHLCDPIETHYLNEQVKAI KELGDHVTNLRKMGAPESGLAEYLFDKHTLG | 1 |
| pmoB1 (33-172) | HGEKSQAAFMRMRTIHWYDLSWSKEKVKINETVEIKGKFHVFEGWPE TVDEPDVAFLNVGMPGPVFIRKESYIGGQLLVPRSVRLEIGKIYDFRVV LKARRPGDWHVHTMMNVQGGPIIGPGKWITVEGSMSEFRNPVTT | 2 |
| pmoB2 (265-414) | QAGTMRGMKPLELPAPTVSVKVEDATYRVPGRAMRMKLTITNHGNS PIRLGEFYTASVRFLDSDVYKDTTGYPEDLLAEDGLSVSDNSPLAPGET RTVDVTASDAAWEVYRLSDIYDPDSRFAGLLFFFDATGNRQVVQIDA PLIPSFM | 3 |
| pmoB1 (H33N, H137A, H139A) | NQEKSQAAFMRMRIIHWYDLSWSKEKVKINETVEIKGKFHVFEGWPE TVDEPDVAFLNVGMPGPVPIRKESYIGGQLVPRSVRLEIGKIYDFRVV KLARRPGDWAVATMMNVQGGGPIIGPGKWTTVEGSMSEFRNPVTT | 4 |
| pmoB1 (H48N, H72N) | HGEKSQAAFMRMRTINWYDLSWSKEKVKINETVEIKGKFNVFEGWPE TVDEPDVAFLNVGMPGPVFIRKESYIGGQLVPRSVRLEIGKTTDFRVV LKARRPGDWHVHTMMNVQGGGPIIGPGKWTTVEGSMSEFRNPVTT | 5 |

$L^{-1}$ ampicillin and 0.2 mM $CuSO_4$) (FIG. 2). When the medium turbidity ($OD_{600}$) reached about 0.6, isopropyl-β-D-thiogalactopyranosid (IPTG) (1 mM) was added to induce gene expression. After incubation at 20° C. for 14 hours, the cultured E. coli were centrifuged at 5,000 rpm for 5 minutes to recover the strain precipitate, and then suspended in 5 mL of crushing solution (50 mM $NaH_2PO_4$, 300 mM NaCl, 10 mM imidazole, 0.2 mM $CuSO_4$, pH 8.0) and crushed using an ultrasonic crusher (Branson Ultrasonics Corp., Danbury, CT, U.S.A). After crushing, centrifugation was performed at 13,000 rpm for 10 minutes, and the supernatant and insoluble aggregates were separated. The isolated supernatant was first subjected to $Ni^{2+}$-NTA affinity chromatography through binding of nickel and histidine fused with each other and expressed on a recombinant protein, followed by concentrating the recombinant protein and exchanging the buffer, so as to obtain a purified recombinant protein. Each stage will be described in detail as follows.

1) $Ni^{2+}$-NTA Affinity Chromatography

In order to purify the recombinant protein, E. coli cultured in the same manner as specified above were recovered and cell pellets thereof were resuspended in 5 mL crushing solution (50 mM $NaH_2PO_4$, 300 mM NaCl, 10 mM imidazole, 0.2 mM $CuSO_4$, pH 8.0), and the cells were crushed using an ultrasonic crusher. The crushed cell fluid was centrifuged at 13,000 rpm for 10 minutes to separate only the supernatant, and then the recombinant protein was separated using a $Ni^{2+}$-NTA column (Quiagen, Hilden, Germany). (Wash buffer: 50 mM $NaH_2PO_4$, 300 mM NaCl, 10 mM imidazole, pH 8.0/Elution buffer: 50 mM $NaH_2PO_4$, 300 mM NaCl, 250 mM imidazole, pH 8.0).

2) Concentration and Buffer Exchange 2 mL of recombinant protein eluted through $Ni^{2+}$-NTA affinity chromatography was put in an ultra-centrifugal filter (Amicon Ultra 100K, Millipore, Billerica, MA) and centrifuged at 5,000 rpm until 1 ml of solution remained on the column. Thereafter, buffer exchange was performed with Tris buffer (20 mM Tris-HCl, 250 mM NaCl, pH 8.0).

[Example 3] Biosynthesis, Purification and Refolding of Recombinant Protein pmoB12

E. coli strain BL21 (DE3) [F⁻omp $ThsdS_B$ (rB⁻mB⁻)] was transformed using the prepared expression vectors, respectively, and transformants resistant to ampicillin were selected. The transformed E. coli were cultured in a flask (250 mL Erlenmeyer flasks, 37° C., 150 rpm) containing 50 mL of Luria-Bertani (LB) medium (containing 100 mg $L^{-1}$ ampicillin). When the medium turbidity ($OD_{600}$) reached about 0.6, isopropyl-β-D-thiogalactopyranosid (IPTG) (1 mM) was added to induce gene expression. After incubation at 37° C. for 6 hours, the cultured E. coli were centrifuged at 5,000 rpm for 5 minutes to recover cell precipitate, and then suspended in 5 mL of crushing solution (50 mM $NaH_2PO_4$, 300 mM NaCl, 10 mM imidazole. 0.2 mM $CuSO_4$, pH 8.0) and crushed using an ultrasonic crusher (Branson Ultrasonics Corp., Danbury, CT, U.S.A). After crushing, centrifugation was performed at 13,000 rpm for 10 minutes, and the supernatant and insoluble aggregates were separated. The separated insoluble aggregate was first subjected to $Ni^{2+}$-NTA affinity chromatography using binding of nickel and histidine fused with each other and expressed on a recombinant protein, and then the recombinant protein was refolded through dialysis. The refolded recombinant protein was concentrated thus to produce a purified recombinant protein. Each stage will be described in detail below.

1) $Ni^{2+}$-NTA Affinity Chromatography

In order to purify the recombinant protein pmoB12, E. coli cultured in the same manner as specified above were recovered and cell pellets thereof were re-suspended in 5 mL crushing solution (50 mM $NaH_2PO_4$, 300 mM NaCl, 10 mM imidazole, 0.2 mM $CuSO_4$, pH 8.0), and the cells were crushed using an ultrasonic crusher. The crushed cell fluid was centrifuged at 13.000 rpm for 10 minutes to separate only insoluble aggregate, and then re-suspended in 5 mL modified solution (50 mM $NaH_2PO_4$, 300 mM NaCl, 6 M Gdn-HCl, pH 8.0) for 1 hour, followed by performing centrifugation at 13,000 rpm for 20 minutes to separate the supernatant only. Thereafter, the recombinant protein pmoB12 was separated using a $Ni^{2+}$-NTA column (Quiagen, Hilden, Germany). (Wash buffer: 50 mM $NaH_2PO_4$, 300 mM NaCl, 6 M Gdn-HCl, pH 6.3/Elution buffer A: 50 mM $NaH_2PO_4$, 300 mM NaCl, 6 M Gdn-HCl, pH 5.9/Elution buffer B: 50 mM $NaH_2PO_4$, 300 mM NaCl, 6 M Gdn-HCl, pH 4.5).

2) Refolding of pmoB12 Through Dialysis Process

In order to slowly remove Gdn-HCl, which induces protein denaturation, in 4 mL of the recombinant protein solution eluted through $Ni^{2+}$-NTA affinity chromatography, pmoB12 was refolded by applying a stepwise dialysis procedure. That is, the recombinant protein was subjected to a dialysis process in a buffer solution (20 mM Tris-HCl, 250 mM NaCl, 1 mM $CuSO_4$, 6 M Gon-HCl, pH 8.0) at 4° C. for 3 hours. A concentration of Gdn-HCl was reduced stepwise by 1M for total 6 times, and in the final step, the dialysis process was repeated three times using a buffer solution without Gdn-HCl (20 mM Tris-HCl, 250 mM NaCl, 1 mM $CuSO_4$, pH 8.0), thereby completely removing Gan-HCl. Finally, the refolded pmoB12 was recovered after completely removing the protein aggregates by centrifugation (13,000 rpm, 20 minutes, 4° C.).

3) Concentration

The refolded pmoB12 obtained through the dialysis process was placed in an ultra-centrifugal filter (Amicon Ultra 100K, Millipore, Billerica, MA) and centrifuged at 5,000 rpm until 1 ml of solution remained on the column.

[Example 4] Analysis of Expression Rate of Recombinant Protein Including the Prepared nMMO-Mimics and Cytoplasm Solubility After performing the above process, an expression rate and cytosolic solubility of the purified recombinant protein nanoparticles were analyzed by SDS-PAGE. Crushed cell pellet solution (lysate) of the recombinant protein including pMMO-mimics, the supernatant (soluble fraction, sol) obtained by centrifugation of the crushed cell fluid, insoluble aggregates (insoluble fraction, insol), and purified or refolded recombinant protein were subjected to SDS-PAGE using 12% Tris-glycine precast gel (Invitrogen, California, U.S.A). Then, a gel was stained with Comasi Blue staining solution, and the stained protein band was analyzed for expression rate and cytosolic solubility of each recombinant protein through a densitometer (GS-800 Calibrated Densitometer, Bio-Rad, California, U.S.A.) (FIG. 3).

[Example 5] Analysis of Structure of Recombinant Protein Including the Prepared pMMO-Mimics After performing the above process, transmission electron microscopy (TEM) was taken for structural analysis of the purified recombinant protein nanoparticles. To obtain stained images of protein nanoparticles, electron microscopy grids including naturally dried samples were incubated with 2% (w/v) aqueous uranyl acetate solution at room temperature for 1 hour. As a result of observing the protein nanoparticle image using a Tecnai 20 (FEI, Hillsboro, Oregon, U.S.A.) electron microscope operating at 200 kV, it was confirmed that spherical nanoparticles were formed. In addition, through dynamic light scattering (DLS) analysis, it was confirmed that spherical nanoparticles having a size of 26.3±3.1 nm, 20.8±3.3 nm. 23.9±3.3 nm, 21.9±3.3 nm, and 12.8±2.1 nm were formed by pMMO-m1, pMMO-m2, pMMO-m3, pMMO-m4, and pmoB-free huHF particle with His6, respectively. Further, through analysis of size-exclusion chromatography (SEC) equipped with HiLoad™ 16/600 Superdex™ 200 pg column (GE Healthcare, Illinois, U.S.A), it was confirmed that the nanoparticles formed by the pMMO-m3 had a size larger than huFH particles having a diameter of about 12 nm but smaller than HBVC particles having a diameter of 32 nm. To analyze a secondary structure and a melting point of the pMMO-m3, circular dichroism (CD) spectrometer (Jasco, Tokyo, Japan) was used. CD spectrum was measured at 200 to 250 nm (1 nm bandwidth, 100 nm/min scan rate), and the secondary structure of the pMMO-m3 was analyzed on the basis of the CD spectrum measured at 20° C. The melting point (Tm) of the pMMO-m3 was calculated through CD spectra measured at different temperatures (30, 40, 50, 60, 70, 80, and 90° C.) (FIG. 4).

[Example 6] Proof of Methane Gas Oxidation Activity of Recombinant Protein Including the Prepared pMMO-Mimics To verify the methane gas oxidation activity of the purified recombinant protein nanoparticles, 1 mL of a recombinant protein solution containing duroquinol (0.35 mM) as a reducing agent was injected into 20 mL of septa-sealed vial (catalogue No. 5182-0837, Agilent). All of the injected pmoB12 (4.8 UM), ferritin-pmoB1 (0.2 μM), pMMO-m1 (0.2 μM), pMMO-m2 (0.4 μM), pMMO-m3 (0.4 μM), site-A mutant of pMMO-m3 (0.4 μM), site-B mutant of pMMO-m3 (0.4 μM) and pMMO-m4 (0.4 μM) include the same number of moles of catalytically active sites (pmoB1, and pmoB2). A methane oxidation reaction through the recombinant protein was initiated by removing 19 mL of air in a headspace through a syringe and injecting 15 mL of methane gas and 4 mL of air. Thereafter, the vial was immediately subjected to an enzymatic reaction in an incubator at 45° C. for up to 20 hours. Further, an amount of methanol as an oxidation product produced by the enzymatic reaction, was measured through gas chromatography (7890B GC, Agilent) to measure a cumulative production amount and a turnover number (FIG. 5).

[Example 7] Confirmation of Catalyst Function

In *E. coli* culture supplemented with a copper salt ($CuSO_4$, 0.0 to 0.3 mM) and/or iron salt ($FeSO_4$, 0.2 mM), pMMO-m3 showing optimal methane oxidation activity confirmed through Example 6 was synthesized. An amount of methanol produced by pMMO-m3 synthesized in specific culture condition, as well as copper and iron contents in pMMO-m3, were measured. Measurement of the copper and iron contents was performed through ICP-MS (FIGS. 6b and c).

As a result, the copper content in pMMO-m3 and the cumulative methanol production amount by the pMMO-m3 reached the maximum level in 0.2 mM $CuSO_4$, while the amount of copper added to pMMO-m3 could affect catalytic domains of pMMO-m3 (pmoB1 and pmoB2) (FIG. 6a). Further, it was confirmed that metal bonding sites other than the copper moiety (e.g., the diiron moiety of huHF) were not involved in the catalytic function of pMMO-m3. Moreover, analysis of pMMO-m3 as well as copper contents in site A-mutations (H188N, H292A, and H294A) and site B-mutations (H203N, and H227N) (FIG. 6b) demonstrated that dinuclear copper atoms and mononuclear copper atoms are detected in each of the copper sites A and B of pmoB1.

[Example 8] Proof of Repetitive Methane Gas Oxidation Activity by a Reaction System Based on a Polyacrylamide Hydrogel Including the Prepared pMMO-Mimics pMMO-m3, which exhibits the optimal methane oxidation activity confirmed through Example 6, was immobilized on a three-dimensional porous hydrogel to establish a new reaction system. Further, whether the activity of the enzyme nanoparticles due to moisture contained in the hydrogel is maintained for a long period of time and whether the above activity may be repeatedly used were proved by the following experiments.

1) Synthesis of Hydrogel Containing Immobilized pMMO-m3

10 mg of pMMO-m3 was first reacted with N-succinimidyl acrylate (NSA, 0.01 mg) dissolved in Tris buffer (20 mM Tris-HCl, 250 mM NaCl, pH 8.0) at 37° C. for 1 hour to obtain vinylated pMMO-m3. NSA remaining without participation in the reaction was removed through an ultracentrifugal filter system (Amicon Ultra 100K, Millipore, Billerica, MA). Next. 709 μL of vinylated pMMO-m3 (1.69 μM) was mixed with 150 μL of 30% acrylamide (29:1 w/w acrylamide:bis-acrylamide, BioRad, U.S.A), 130 μl of 1 M Tris-HCl (pH 6.5), 10 μl of 10% (w/v) ammonium persulfate (APS) and 1 μl of 0.8 M tetramethylethylenediamine (TEMED), and the mixture was divided by 25 μl followed by putting each of the divided mixtures in a transparent 384-well plate. Then, the mixture was allowed to stand at 25° C. for 16 hours so as to be copolymerized. As a result, an acrylamide-based hydrogel containing immobilized pMMO-m3 was produced. The hydrogel to which pMMO-m3 is immobilized was subjected to Pt coating and, through FE-SEM (quanta 250 FEG, FEI, Oregon, U.S.A), the porous structure and distribution of pMMO-m3 in the hydrogel were confirmed. The distribution of pMMO-m3 in the hydrogel was analyzed through FE-SEM by treating the hydrogel with a gold nanoparticle-labeled histidine antibody (anti-H6 antibody, Santa Cruz, Texas, U.S.A) for 2 hours, increasing a size of gold nanoparticles using a silver enhancement kit (Sigma Aldrich), followed by Pt coating.

2) Proof of Repetitive Methane Oxidation Activity by Application of Hydrogel Containing Immobilized pMMO-m3

To verify methane oxidation activity of the hydrogel containing immobilized pMMO-m3 formed by the above process, duroquinol was used as a reducing agent. 2 mL of Tris buffer (20 mM Tris-HCl, 250 mM NaCl, pH 8.0), in which 20 hydrogels containing immobilized pMMO-m3 (total $6\times10^{-4}$ μmoles of pMMO-m3) are included, as well as duroquinol (0.35 mM) were injected into 20 mL of septa-sealed vial (catalogue No. 5182-0837, Agilent). A methane oxidation reaction was initiated by removing. 18 mL of air in the headspace through a syringe, and injecting 14.5 mL of methane gas and 4.5 mL of air. Thereafter, the vial was immediately subjected to an enzymatic reaction in an incubator at 45° C. for 20 hours. Then, an amount of methanol, which is an oxidation product obtained by the enzymatic reaction, was measured through gas chromatography (7890B GC, Agilent) to determine a cumulative production amount. In order to verify the repetitive methane oxidation reaction, a lid of the vial was opened while removing a shade thereof after 20 hours of reaction, followed by collecting 20 hydrogels containing immobilized pMMO-m3 and washing the same in Tris buffer three times. The washed hydrogels containing immobilized pMMO-m3 were put into a 20 mL septa-sealed vial and subjected to methane oxidation in the same manner. As a result, it was confirmed that about 6 times of repeated use is possible for about 120 hours (FIG. 7).

INDUSTRIAL APPLICABILITY

According to the present invention, the active sites (pmoB1, and pmoB2) of methane oxidase derived from methane-oxidizing bacteria are fused with each other and expressed so as to be expressed on the surface of a protein that can be self-assembled in cells to form nanoparticles, whereby the active sites of methane oxidase retain activity even on the surface of the protein nanoparticles and allow methane to be oxidized to methanol.

As described above, a specific portion of the content of the present invention has been described in detail. For those skilled in the art, this specific technology is only a preferred embodiment, and it will be obvious that the scope of the present invention is not limited thereby. Accordingly, it will be understood that the substantial scope of the present invention is defined by the appended claims and equivalents thereof.

Sequence Free Text
Electronic file attached.

The invention claimed is:

1. An enzyme nanoparticle comprising:
a first active domain of a methane monooxygenase (MMO) comprising the amino acid sequence of SEQ ID NO: 2 and a second active domain of the MMO comprising the amino acid sequence of SEQ ID NO: 3; and a human ferritin heavy-chain protein, wherein the first active domain and the second active domain are fused to a surface of the human ferritin heavy-chain protein, wherein the enzyme nanoparticle converts methane to methanol, and wherein the MMO and the human ferritin heavy-chain protein are linked by a peptide linker.

2. An enzyme nanoparticle comprising:
a first active domain of a methane monooxygenase (MMO) comprising the amino acid sequence of SEQ ID NO: 4 and a second active domain of the MMO comprising the amino acid sequence of SEQ ID NO: 3; and a human ferritin heavy-chain protein, wherein the first active domain and the second active domain are fused to a surface of the human ferritin heavy-chain protein, wherein the enzyme nanoparticle converts methane to methanol, and wherein the MMO and the human ferritin heavy-chain protein are linked by a peptide linker.

3. An enzyme nanoparticle comprising:
a first active domain of a methane monooxygenase (MMO) comprising the amino acid sequence of SEQ ID NO: 5 and a second active domain of the MMO comprising the amino acid sequence of SEQ ID NO: 3; and a human ferritin heavy-chain protein, wherein the first active domain and the second active domain are fused to a surface of the human ferritin heavy-chain protein, wherein the enzyme nanoparticle converts methane to methanol, and wherein the MMO and the human ferritin heavy-chain protein are linked by a peptide linker.

* * * * *